United States Patent [19]

Bonney

[11] 4,027,697
[45] June 7, 1977

[54] ROTARY VALVE

[76] Inventor: Roland W. Bonney, R.F.D. No. 1, Box 65, Kennebunkport, Maine 04046

[22] Filed: Nov. 19, 1975

[21] Appl. No.: 633,559

[52] U.S. Cl. .............................. 137/596; 137/596.2; 137/625.23

[51] Int. Cl.² ....................................... F16K 11/00

[58] Field of Search .......... 137/596.2, 596, 625.23; 91/467, 445

[56] References Cited

UNITED STATES PATENTS

| | | | |
|---|---|---|---|
| 1,897,075 | 2/1933 | Samson | 91/467 |
| 2,328,606 | 9/1943 | Boldt | 137/625.23 X |
| 2,728,353 | 12/1955 | Bonham | 137/625.23 |
| 2,749,941 | 6/1956 | Gardner | 137/625.23 |
| 2,980,138 | 4/1961 | Detweiler et al. | 137/625.23 X |
| 3,213,881 | 10/1965 | Findlay et al. | 137/596 |
| 3,610,283 | 10/1971 | Hill et al. | 137/625.23 |
| 3,774,634 | 11/1973 | Bonney | 137/596 |

Primary Examiner—Irwin C. Cohen
Attorney, Agent, or Firm—Cushman, Darby & Cushman

[57] ABSTRACT

A rotary spool is provided with four axially extending grooves in its outer peripheral surface. Alternating ones communicate with opposite ends of the spool and terminate short of the respective other ends. Each spool end communicates with a respective chamber. Each chamber is communicated to a check valve which may be opened by pressure in the chamber, or opened by a respective cam on the spool. By preference the spool has an operating handle, which, when in neutral, communicates the inlet with an outlet, and when rotated 45° clockwise or counterclockwise communicates the inlet with a respective check valve and communicates the conduit beyond the other check valve with the outlet, while the respective cam holds said other check valve open.

2 Claims, 5 Drawing Figures

ROTARY VALVE

BACKGROUND OF THE INVENTION

During a study of publications having possible relation to the present invention, the inventor has become aware of the following prior U.S. patents:

| Patentee | Patent No. | Issue Date |
| --- | --- | --- |
| Benbow et al. | 1,178,208 | April 4, 1916 |
| Gardner | 2,749,941 | June 12, 1956 |
| Tobias | 3,700,004 | Oct. 17, 1972 |
| Andis | 3,754,574 | Aug. 28, 1973 |
| Bonney | 3,774,504 | Nov. 27, 1973 |

The present invention was made by the latter patentee, Bonney, while seeking to provide a valve with no internal channeling in either the spool or body, eliminating complicated castings and machining, for a valve that can be made smaller than comparable sliding spool valves, that operates easier than a sliding spool valve and which provides zero leakage without a need for the close spool tolerance needed in sliding spool valves that do not have ball checks.

SUMMARY OF THE INVENTION

The invention provides a rotary spool valve which accomplishes the above-listed objectives.

In its preferred form, the valve rotary spool is provided with four axially extending grooves in its outer peripheral surface. Alternating ones communicate with opposite ends of the spool and terminate short of the respective other ends. Each spool end communicates with a respective chamber. Each chamber is communicated to a check valve which may be opened by pressure in the chamber, or opened by a respective cam on the spool. By preference the spool has an operating handle, which, when in neutral, communicates the inlet with an outlet, and when rotated 45° clockwise or counterclockwise communicates the inlet with a respective check valve and communicates the conduit beyond the other check valve with the outlet, while the respective cam holds said other check valve open.

The principles of the invention will be further discussed with reference to the drawing wherein a preferred embodiment is shown. The specifics illustrated in the drawing is intended to exemplify, rather than limit, aspects of the invention as defined in the claims.

IN THE DRAWING

DETAILED DESCRIPTION OF THE PRESENTLY PREFERRED EMBODIMENT

Figure 1:
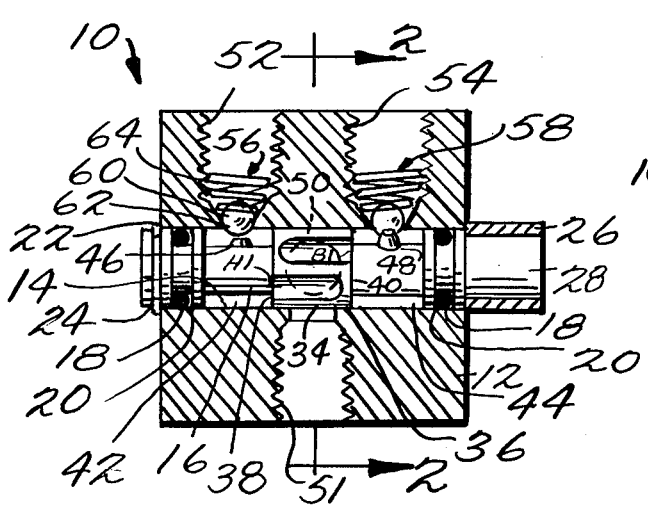
FIG. 1 is a longitudinal cross-sectional view of the valve. The inlet, which has been cut away in this view, would be down into the plane of the figure at the spool.
Figure 3:
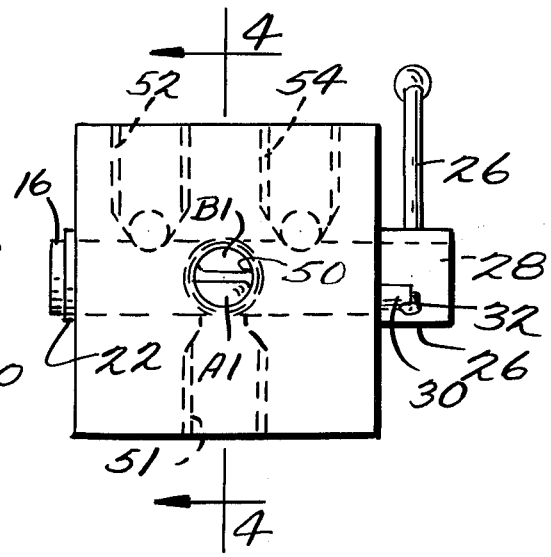
FIG. 3 is a front elevation view of the valve.
Figure 2:
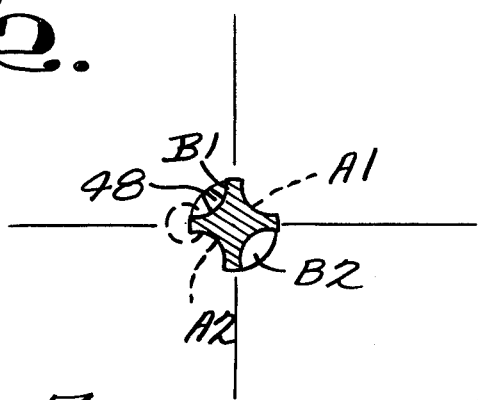
FIG. 2 is a schematic transverse cross-sectional view of the valve spool, taken substantially on line 2—2 of FIG. 1.
Figure 4:
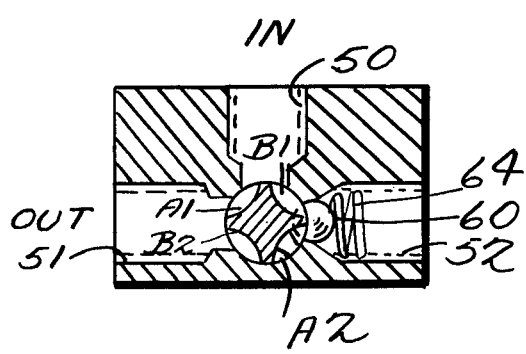
FIG. 4 is a schematic transverse cross sectional view of the valve spool, taken substantially on line 4—4 of FIG. 3.
Figure 5:
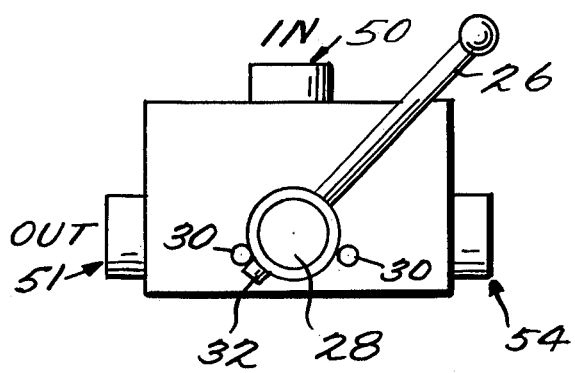
FIG. 5 is an end elevation view of the valve, with the operating handle rotated 45° clockwise from neutral.

In the preferred embodiment, the valve 10 includes a housing 12 having a throughbore 14 which receives a valve body member 16. The member 16 is provided with grooves 18 which receive seal rings 20 for sealing between the member 16 and the housing 12 within the throughbore 14. A snap ring 22 or the like mounted in a groove 24 near one protruding end of the member 16 prevents that end of the member from moving axially into the throughbore. Similarly, an operating handle 26 is secured on the opposite protruding end portion 28 of the member 16, preventing that end portion from moving axially into the throughbore.

A pair of stop lugs 30 is provided on the housing for engagement by a boss 32 on the operating handle 26 to confine possible rotation of the member 16 between two angular extremes, i.e. 45° clockwise and 45° counterclockwise from a neutral position.

Centrally of the member 16, an axially short cylindrical spool 34 is provided, with an outer diameter nearly as great as the diameter of the throughbore, so the member including the spool is rotatable, but the spool functions as a valve body in the throughbore.

Accordingly, the outer peripheral surface 36 of the spool 34 is provided with four axially extending grooves A1, B1, A2, B2, equally spaced angularly of the surface 36. The diametrically opposed grooves A1 and A2 communicate with one end 38 of the spool, but terminate short of the opposite end 40 of the spool. The diametrically opposed grooves B1 and B2 communicate with the opposite end 40 of the spool, but terminate short of the one end 38 thereof.

Between each seal ring 20 and the respectively nearest end 38, 40 of the spool, the member 16 is of reduced diameter to provide respective first and second chambers 42, 44.

The member 16, within the first chamber 42 is provided with a first cam 46 projecting radially outwards at the same relative angular position as the spool groove A2. The member 16, within the second chamber 44 is provided with a second cam 48 projecting radially outwards at the same relative angular position as the spool groove B1.

The valve housing is shown provided with an inlet 50 and an outlet 51 each of which intersects with the throughbore 14 radially of the spool, at 90° angularly of the spool from one another.

The valve housing is shown further provided with two additional passages 52, 54, for instance leading to respective hydraulic cylinders (not shown) or other items of equipment to be operated by use of the valve 10. The passages 52, 54 are provided with respective check valves 56, 58, for instance ball checks of the sort described in my earlier U.S. Pat. No. 3,774,504, issued Nov. 27, 1973. As shown, the check valves 56, 58 each includes a ball 60 normally pressed into closing contact with a seat 62 by a compression coil spring 64. The disposition of each valve 56, 58 is such that when the respective first or second cam 46, 48 is rotated to point toward the respective check valve, the cam forces the ball off its seat, holding that check valve open.

For other purposes the passages 52, 54 could be provided but one or both of the check valves omitted therefrom.

The following tabulation summarizes operation of the illustrated valve 10 when the operating handle 26 is at each of three possible positions: neutral, 45° CW and 45° CCW.

Neutral

A1 — connects inlet with outlet, connects inlet with A2
B1 — connects inlet with second chamber and with B2
A2 — connects with first chamber
B2 — connects second chamber with outlet
First Cam — off
Second Cam — off
Result: Flow in at inlet is divided; part passes from A1 to outlet, remainder passes from B1 to second chamber and to B2, and from B2 to the outlet.

45° CW

A1 — connects the inlet with the first chamber
B1 — connects with the second chamber
A2 — connects with the first chamber
B2 — connects the second chamber with the outlet
First Cam — off
Second Cam — operating
Result: Fluid pressure may open the first check valve and permit flow from the inlet, through A1, through the first chamber, through the first check valve and into the first additional passage 52. The second additional passage 54, (and B1) can drain through the second check valve, through the second chamber and through B2 to the outlet.

45° CCW

A1 — connects the first chamber with the outlet
B1 — connects the inlet with the second chamber
A2 — connects with the first chamber
B2 — connects with the second chamber
First Cam — operating
Second Cam — off
Result: The first additional passage 52 (and A2) can drain through the first check valve, through the first chamber and through A1 to the outlet. Fluid pressure may open the second check valve and permit flow from the inlet, through B1, through the second chamber, through the second check valve and into the second additional passage 54.

Note that A2 directs flow in and out of the first additional passage 52 and that A2 is provided to effect the spool balance which is necessary for high pressure operation. B1 and B2 are both used to direct flow in and out of the second additional passage 54. Thus, A1 must be of the same area and directly opposed to A2 and B1 must be of the same area and directly opposed to B2 in order to have the spool substantially in perfect hydraulic balance.

Several advantages inhere from the construction just described. Because the housing and valve spool need no internal channeling to provide channels A1, A2, B1 and B2, complicated castings and machine work are eliminated. The valve 10 may be physically smaller than comparable sliding spool valves. With the ball checks, substantially zero leakage is obtained without the close spool tolerance required for sliding spool types without valve checks. Generally, the need for cylinder locking valves is eliminated. The flow provided can be controlled or metered on either or both ball checks by varying the amount that the respective cam lifts the respective ball off its seat.

It should now be apparent that the rotary valve as described hereinabove, possesses each of the attributes set forth in the specification under the heading Summary of the Invention hereinbefore. Because the Rotary Valve can be modified to some extent without departing from the principles of the invention as they have been outlined and explained in this specification, the present invention should be understood as encompassing all such modifications as are within the spirit and scope of the following claims.

What is claimed is:
1. A rotary valve, comprising:
   a housing having means defining a throughbore;
   a valve body member rotatably received in the throughbore;
   an operating handle secured on and forming part of the valve body member axially beyond the throughbore;
   retaining means acting between the valve body member and the housing to prevent substantial axial movement of the valve body member;
   a spool defined on the valve body member at an axially intermediate portion of the valve body member;
   four axially extending grooves in the spool, equally spaced angularly of the outer periphery of the spool, one diametrically opposed pair of the grooves being of equal area, communicating with one end of the spool and terminating short of the opposite end of the spool and the other diametrically opposed pair of the grooves being of equal area, communicating with the opposite end of the spool and terminating short of the one end of the spool;
   two respective circumferential seal ring means sealing between the valve body member and the housing throughbore distally of the one end of the spool and distally of the other end of the spool;
   at least one of the valve body member and the housing being circumferentially relieved within the throughbore at two sites, one between said sealing ring means and said one end of the spool, and another between said sealing ring means and said other end of the spool to provide a first and a second respective chambers;
   an inlet passage communicating with the spool through the housing intermediate the axial extent of the spool;
   an outlet passage communicating with the spool through the housing intermediate the axial extent of the spool at a site disposed about one-quarter of the way angularly of the spool from where the inlet passage communicates with the spool;
   a first auxiliary passage communicating with the first chamber through the housing; and
   a second auxiliary passage communicating with the second chamber through the housing;
   a normally closed check valve interposed in the first auxiliary passage, said check valve disposed to open away from the first chamber;
   a cam mounted on the valve body member and disposed to forcibly open the check valve when the valve body member is rotated to a respective angular position;
   a stop provided on the valve body member;
   two stops provided on the housing for engagement by said valve body member stop when the operating handle is rotated in two respectively angularly opposed senses, to limit rotation of the valve body member to substantially a quarter turn, the stops defining the clockwise and counterclockwise ex- tremes of rotation, and a neutral position being defined angularly centrally of these two extremes;

a second normally closed check valve interposed in the second auxiliary passage, said check valve disposed to open away from the first chamber;

a cam mounted on the valve body member and disposed to forcibly open the second check valve when the valve body member is rotated to a second respective angular position;

the two stops on the housing being so positioned that when the handle is rotated to one angular extreme, the first-described check valve is held forced open by its associated cam and the second check valve is undisturbed by its associated cam, when the handle is rotated to the opposite angular extreme, the second check valve is held forced open by its associated cam and the first-described check valve is undisturbed by its associated cam, and when the handle is rotated to its neutral position, neither cam disturbs its associated check valve;

the stops on the housing are so arranged relative to the grooves on the spool that when the handle is rotated to its neutral position the inlet passage of the housing is communicated to one groove of each of said pairs;

the following tabulation summarizing operation of the valve when the operating handle is in each of said three positions thereof:

a. when the handle is in the neutral position thereof:
  one groove of said one pair connects the inlet passage with the outlet passage and connects the inlet passage with the other groove of said one pair;
  one groove of said other pair connects the inlet passage with said second chamber and with the other groove of said other pair;
  the other groove of said one pair connects with said first chamber;
  the other groove of said other pair connects said second chamber with said outlet passage; neither cam is forcing open a check valve, whereby fluid flow in at the inlet passage is divided, part passing from said one groove of said one pair to said outlet passage, and the remainder passing from said one groove of said other pair to said second chamber and to said other groove of said other pair then to said outlet passage;

b. when the handle is rotated 45° clockwise from said neutral position thereof:
  said one groove of said one pair connects said inlet passage with said first chamber;
  said one groove of said other pair connects with said second chamber;
  said other groove of said one pair connects with said first chamber;
  said other groove of said other pair connects said second chamber with said outlet passage;
  said first cam is inactive;
  said second cam is forcing said second check valve to remain open,
  whereby, fluid pressure may open said first check valve and permit flow from said inlet passage, through said one groove of said one pair, through said first chamber, through said first check valve and into said first additional passage, and said second additional passage and said other groove of said other passage and said other groove of said other pair may drain through said second check valve, through said second chamber and through said other groove of said other pair, to said outlet passage; and c. when the handle is rotated 45° counterclockwise from said neutral position thereof:
  said one groove of said one pair connects said first chamber with said outlet passage;
  said one groove of said other pair connects said inlet passage with said second chamber;
  said other groove of said one pair connects with said first chamber;
  said other groove of said other pair connects with said second chamber;
  said first cam is forcing said first check valve to remain open;
  said second cam is inactive,
  whereby, said first additional passage and said other groove of said one pair may drain through said first check valve, through said first chamber and through said one groove of said one pair to said outlet passage, and fluid pressure may open said second check valve and permit flow from said inlet passage, through said one groove of said other pair, through said second chamber, through said second check valve and into said second additional passage.

2. The rotary valve of claim 1, wherein:
the check valves are ball checks, each including a circumferentially extending seat in the respective auxiliary passage, a ball arranged to close the respective auxiliary passage by engaging the respective seat; and spring means arranged to normally urge the ball into sealing engagement with the respective seat.

* * * * *